July 27, 1971 A. J. ANDREATCH 3,595,621
CATALYTIC ANALYZER
Filed Sept. 30, 1968
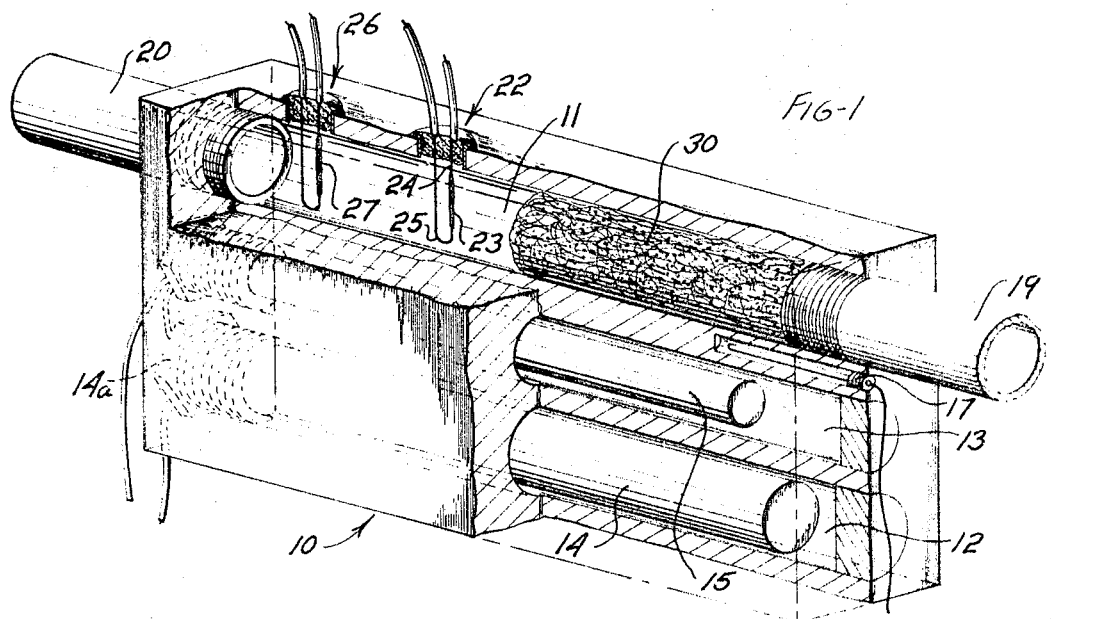
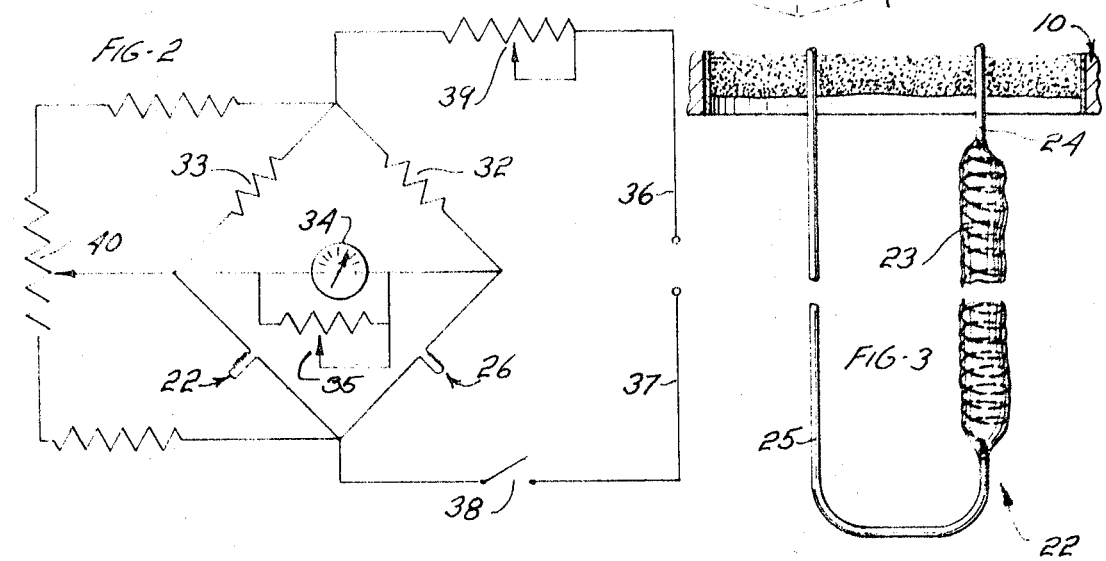
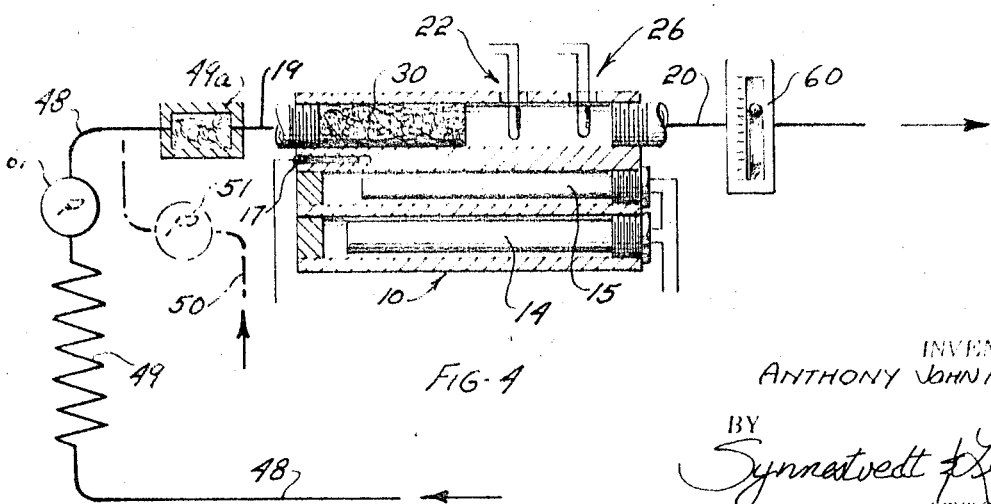
INVENTOR.
ANTHONY JOHN ANDREATCH
BY
Synnestvedt & Lechner
ATTORNEYS

United States Patent Office 3,595,621
Patented July 27, 1971

3,595,621
CATALYTIC ANALYZER
Anthony John Andreatch, 21 Hodge Road,
Kendall Park, N.J. 08824
Filed Sept. 30, 1968, Ser. No. 763,625
Int. Cl. G01n 31/10, 31/12
U.S. Cl. 23—254E      7 Claims

ABSTRACT OF THE DISCLOSURE

A gas analysis technique and method of detecting the presence of certain constituents of a gas. A filament having a high thermal coefficient of conductivity is coated with an oxide catalyst and positioned in a gas stream to be analyzed. A heater supplies heat to the stream as it is passed to the catalyst coated filament and maintains the stream at temperatures at which the components of the stream to be detected react in the presence of the catalyst. Detecting elements coated with selective catalysts and made of tungsten filaments are disclosed.

DISCLOSURE

This invention relates to the anaylsis of the components of a gas, and more particularly to a method of analysis and apparatus therefore in which selected components of a gas are detected by means of a catalytic reaction between a metallic oxide type catalyst and the selected components.

The invention has particular utility in the analysis of the products of combustion of hydrocarbon fuels and is especially adapted for detecting the presence of carbon monoxide and/or hydrocarbons in the exhaust of automotive internal combustion engines.

Problems of air pollution and the developing science of pollution control have led to the need for simple and reliable instruments for detecting air pollutants, particularly for detecting and measuring quantities of those pollutants discharged to the atmosphere by internal combustion engines. The magnitude of this pollution may be appreciated upon consideration of the finding that hydrocarbon emissions from automobiles in the Los Angeles area alone total more than 2,500 tons per day, while carbon monoxide emissions total about 8,000 tons per day. Although various measuring instruments have long been available on the market, they are, for the most part, rather complex and expensive pieces of apparatus. Most of them are either unduly complicated to operate, or have such slow response times as to render them impractical for use for automotive engine testing, at least where a substantial number of automobiles are to be tested within a reasonably short time period. In any event, no instrument is currently available which provides accurate results at a cost low enough to permit widespread use in garages and gasoline filling stations.

This need has become a particularly acute one with the advent of Federal standards for new cars and State standards for all automobiles for carbon monoxide and hydrocarbon content of automotive exhaust gases. In order to properly tune automotive engines so that automobiles will pass State inspection standards about to come into force, all of those involved in the repair and maintenance of automobile engines will have to be able to carry out routine and regular analysis of exhaust gas.

Accordingly, an important object of the present invention is the provision of a simple and reliable means for analyzing combustible constituents in a gas.

Another object of the invention is the provision of an analyzer which can be operated by relatively unskilled individuals without the need for extensive training, is durable, and does not require extensive maintenance or servicing.

A still further object of the invention is the provision of a gas analyzer which is relatively insensitive to variations in fuel compositions.

Other objects of the invention relate to the provision of improved thermally responsive sensing elements.

Still other objects and advantages of the invention relate to the provision of an exhaust gas analyzing instrument which is relatively inexpensive to manufacture while possessing characteristics of reliability and sensitivity necessary for use as an adjunct to a program of inspection of engine exhaust gases and control of pollutants.

Other objects relate to the provision of an improved method of gas analysis.

According to the invention, the various objects and advantages are carried out by the use of a detecting element comprised of a filament having a high thermal coefficient of resistance, which filament is connected in an electrical measuring circuit. The invention includes the concept of coating a filament with a selective catalyst for the carbon monoxide and/or hydrocarbons, passing the gas to be analyzed through a zone in which a catalytically coated filament is mounted, and supplying heat to the zone from a source which preheats gas and catalyst.

In accordance with the invention, the reaction of the selected or sought-for constituents of the gas and oxygen in the presence of the catalyst produces a change of temperature and, consequently, of resistance in the filament which results in a detectible and measurable change in the parameters of an electrical circuit. This change is a function of the quantity of the constituent and can thus provide a measure of the quantity of the constituent in the gas being analyzed.

An important aspect of the invention lies in the use of selected oxidation catalysts which are only reactive in the presence of carbon monoxide and/or hydrocarbons within predetermined temperature ranges. A preferred catalyst is a selective catalyst consisting of a mixture of about 50% manganese dioxide, 30% copper oxide, 15% cobalt oxide, and 5% silver oxide. Such a catalyst is readily available on the market, being sold by Mine Safety Appliances Company under the trademark Hopcalite. Hopcalite is a catalyst for carbon monoxide over a wide range of temperatures. It is also reactive to hydrocarbons at the upper end of the same range of temperatures. According to the invention, when Hopcalite is employed, the apparatus may be operated so as to simultaneously detect the total hydrocarbon and carbon monoxide content or operated only to detect the presence of carbon monoxide. Carbon monoxide only is measured by either filtering out the hydrocarbons with a carbon filter or by operating within the range of temperatures at which the catalyst is non-reactive with most hydrocarbons.

Although Hopcalite has been used as a catalyst in some instruments made for carbon monoxide measurements, so far as I have been able to determine these have hitherto been of the packed bed type. A major difficulty with instruments of this type, when used for automobile exhaust gas analysis, is the very slow response or recovery time of the catalyst following each use. In a typical known commercially available instrument, nearly sixty seconds are required for the instrument to recover from change in carbon monoxide content. In addition, the Hopcalite is poisoned by water when the catalyst is operated at the low temperatures employed. The slow response time and the water poisoning problem make such an instrument unworkable for garage testing of automobile exhausts, especially when cycle testing is involved.

Another preferred catalyst is vanadium pentoxide ($V_2O_5$). This catalyst is reactive with hydrocarbons and is used for detecting the presence of hydrocarbon content of the gas mixture. It is not reactive with carbon monoxide at temperatures below about 750° F. and is not sensitive to or poisoned by other exhaust gas constituents.

According to the invention, a detecting element is prepared by coating a filament with the catalyst. Special features of the invention lie in the way in which the coating is applied. Preferably, the filament used is a tungsten wire and an important feature of the invention lies in the coating of the filament in such manner that the entire surface area of the filamentary material is isolated from the gas being analyzed.

The use of tungsten is of special advantage inasmuch as the tungsten is extremely sensitive to changes in temperature and shows no catalytic activity for the products of combustion of hydrocarbon fuels. Thus, the selection of tungsten permits the use of a relatively small mass of catalyst having a very small surface area exposed to the gas stream. Since recovery time is a function of mass and surface area and because a small mass and surface area is involved, recovery of activity of the catalyst is extremely rapid. By way of example, I have found that filaments can be coated so that recovery time is generally less than ten seconds and may be as short as something on the order of under two seconds.

Reference is now made to a detailed description of a preferred embodiment of the invention as illustrated in the accompanying drawings in which:

FIG. 1 shows in perspective view a preferred form of gas detecting equipment;

FIG. 2 shows in schematic form a preferred form of circuitry used for carrying out the invention;

FIG. 3 is an enlarged view of a detecting element used with the apparatus of FIGS. 1 and 2; and FIG. 4 is a schematic overall view of an analyzer embodying features of the invention.

In carrying out the invention in its illustrative form, a gas analyzing unit comprises a housing 10 in which a gas flow conduit or passageway 11 is provided. Conveniently, housing 10 is a solid block, formed of aluminum or of stainless steel, through which the conduit 11 is drilled. The block which comprises the housing 10 is also provided with two other cavities 12 and 13, respectively, these cavities conveniently extending lengthwise of the block and parallel to the conduit 11.

According to the invention, means are provided for heating conduit 11 and thus the detecting element and the gas stream. In the preferred embodiment of the invention, this means comprises an electrical heating element 14 which fits within the cavity 12. Heat is thus transferred by means of conduction to the walls of conduit 11. In this regard, the selection of aluminum as the material for the block is of some advantage in view of its relatively high thermal conductivity and its resistance to the corrosive effects of the exhaust gases. Stainless steel may also be employed.

In order to secure the heater element in place, cavity 12 is threaded and the heater element is provided with cooperating threads on its shank, adjacent its outer end. Wrenching surfaces 14a provide a means for locking the heater in place.

The cavity 13 houses a thermostate 15 which is provided for the purpose of regulating the amount of heat supplied by the heater 14. For this purpose, the thermostate 15, which is typically of the bi-metallic type, is connected in series with the heater. If desired, a thermocouple 17 housed in a bore adjacent the conduit 11 may also be provided, the thermocouple 17 being connected to a temperature indicating meter, not shown.

As indicated above, a supply of gas to be analyzed is fed through the conduit 11 and for this purpose each end of the conduit is threaded so as to provide means of connection of the housing to threaded conduit pieces 19 and 20. Conduit 19 is connectible to a supply of gas as will be described presently.

According to the invention, a thermally responsive resistive element 22 is located within the conduit 11 in the path of the gas to be analyzed. Element 22, shown in somewhat enlarged form in FIG. 3, is preferably comprised of a coil of fine diameter filamentary material 23, the ends of which are soldered to support leads 24 and 25 of known construction.

Although some of the advantages of the invention could be achieved with other filamentary materials, filaments made of tungsten are ideally suited for the purpose. Tungsten has a very high thermal coefficient of resistance and thus makes it possible to provide an instrument which is extremely sensitive to the components of the gas to be detected. Another important advantage with the use of tungsten is that it is chemically inert with respect to the gas components in exhaust gases, that is, it exhibits no catalytic activity to carbon monoxide or to the hydrocarbons or other constituents present in the gas to be analyzed.

In carrying out the invention, all of the surface area of the filament 23 should be coated with the catalyst. Preferably, the catalyst can be prepared by mixing it in powdered form with a suitable cement. A variety of cements are suitable for the purpose and the selection thereof is based on the absence of reaction with any constituents of the gas stream, resistance to absorption, and stability at the temperatures to be employed during the analysis. A suitable cement for the purpose is a commercially available synthetic porcelain of the kind manufactured by Sauereisen Cement Company of Pittsburgh, Pa., U.S.A., and identified as "Cement #33."

In coating the filaments, a paste of cement and catalyst in porportion of one part powdered catalyst to one part cement is prepared. The paste is applied to the filament by any suitable means, as by application with a fine brush. In coating the filament, care should be taken so that all parts of the filament are covered. Preferably, sufficient paste should be applied so that the ends of the support lead are also covered as is the core of the coil filament whenever the filament is used in a coiled form. Filaments so coated are thereafter cured by baking at a temperature of about 450° F. for about eight hours.

When the tungsten filaments are coated in accordance with the above described technique, the tungsten is isolated from the gaseous atmosphere and thus is at all times protected from oxidation. In addition, the relatively fragile filament is appreciably reinforced by the hardened cement, thus minimizing breakage due to mishandling of the instrument.

It is preferred that a second thermally sensitive element 26 be mounted in the gas stream at a point spaced from the filament 22. Thermally sensitive element 26 is similar in all respects to sensing element 22, except that it is not coated with a catalyst. Instead, a coating of cement which coats all portions made of tungsten is applied. The same cement referred to above is preferred. Preferably, the coating extends onto the support wires for the filament, thereby giving this filament the reinforcement noted above. For reasons which will appear presently, the tungsten filament 27 should have characteristics which are substantially identical to those of filament 23. The significance of this will appear hereinafter.

Briefly reviewing the arrangement described above, the gas to be analyzed is directed through conduit 19 and through the gas flow conduit 11, in which the filaments are mounted. As noted, an important feature of the invention lies in the provision of the heater 14 for transferring heat to the gas within the gas flow conduit 11 before it reaches the reaction zone where filament 23 is located. Preferably, and as shown in the preferred embodiment of the invention as illustrated in FIG. 1, heating of the gas within the conduit 11 is effected by conduction through the aluminum housing to the conduit side walls. In order to assure that the gas is heated to the required temperature, a heating transfer medium, typically formed of aluminum mesh screening, is packed into the gas flow conduit 11, as shown at 30 in the region just upstream from the thermally responsive element 22. As the gas flows through the mesh which has been heated by the heater 14, its temperature is raised to the proper temperature required for catalytic combustion in the region of thermally sensitive element 22.

Although the temperature at which the catalytic reaction takes place may vary somewhat, the following criteria may be observed in carrying out the reaction. Certain catalysts, such as Hopcalite noted above, are poisoned by water at relatively low temperatures. By maintaining the temperature above about 212° F. and preferably above about 250° F., the problem of water poisoning is substantially eliminated. Poisoning of the catalyst may also result during certain temperature ranges by the physical absorption of hydrocarbons. Although a catalyst deactivated by absorption of hydrocarbons can be made reactive by periodically burning off the absorbed hydrocarbons, it is preferred that the analysis be carried out at temperatures above about 475° F. when the instrument is being used to detect the presence of carbon monoxide. At these temperatures, Hopcalite is reactive only with carbon monoxide and is not poisoned by hydrocarbons. As a practical matter, an upper limit of temperature of about 750° F. is dictated by the inability of the materials of which the instrument is made to withstand higher temperatures, although higher temperatures are theoretically possible.

In cases where the catalyst employed is vanadium pentoxide, the temperature to which the catalyst must be heated is also dependent upon the component of the gas to be detected. Vanadium pentoxide has almost no response to carbon monoxide and $H_2$ at temperatures below 750° F. The hydrocarbons can thus be determined in the presence of carbon monoxide and/or $H_2$. In addition, the response can be made selective as to different hydrocarbon classes by changing the temperature at which the reaction takes place. At low temperatures, the vanadium pentoxide catalyst is very selective to reactive hydrocarbons. Increasing temperature also results in a response for higher hydrocarbons. At high temperatures, the analyzer approaches the response obtained for total hydrocarbons with a flame ionization detector.

In measuring the proportions of the selected component of the gas stream electrical circuitry such as a conventional bridge shown in FIG. 2 is preferably employed. As shown in FIG. 2, the catalytically coated detecting element 22 is electrically connected in one arm of the bridge and element 26 is connected in a second arm of the bridge. The two other arms, with fixed resistances 32 and 33 and a meter 34, are connected across the null points of the bridge. The meter 34 is provided with a variable gain control resistor 35.

DC power is provided to the bridge via leads 36 and 37 and on/off switch 38 is connected in the line 37 and provides for connection of the power supply to the bridge. A variable resistor 39 is located in line 26 for the purpose of selecting the desired current.

A variable resistance 40 is connected across the bridge and the power supply in such manner that the bridge can be balanced, at which point a zero setting on meter 34 is obtained, as will be readily appreciated by those skilled in the art.

An explanation of the use of the apparatus for the purpose of carbon monoxide detection will now be made, with special reference to FIGS. 1 and 2. Assume first the power is turned on and the bridge is balanced by means of the variable resistance 40 and the meter 34, with the meter 34 indicating that no current is flowing. The block heater is operated for a sufficiently long period of time, for example about five minutes, so as to raise the temperature to a level suitable for the detection of carbon monoxide, that is, about 525° F. As gas flows through the gas flow conduit 11, it is heated via the heat transfer medium 30 and as it passes the sensing element 22, catalytic reaction takes place and the carbon monoxide combines with oxygen to form carbon dioxide. The temperature rise due to the heat of the reaction causes a proportional change in the resistance of the filament 23 which causes an imbalance in the bridge circuit, which condition of imbalance is indicated on the meter 34. Since this condition of imbalance is proportional to the carbon monoxide content, a reading of the volume percentage of carbon monoxide in the gas stream is obtained.

As noted above, a compensating or reference element 26 is also preferably located in the gas stream. Although this element need not be used where precise readings are not required, the advantage of such an element can be appreciated when it is considered that conditions in the conduit other than the catalytic reaction may cause imbalances in the bridge circuitry. Such temperature variations can result due to gas flow effects and variation in gas conductivity effects and the like. As temperature changes caused by these extraneous effects will be sensed by other thermally responsive elements, the bridge will be maintained in balance except when the gas component to be detected is being burned.

The mechanical aspects of the analyzing instrument when used for the detection of CO or hydrocarbons in an internal combustion engine exhaust, are shown in schematic form in FIG. 4. As shown in that figure, a conduit 48 is provided for connection to a supply of gas to be analyzed. In a typical installation, a hose or conduit 48 is adapted to be connected directly to an automobile exhaust pipe. Hose 48 leads to a condenser or water trap 49 provided for the purpose of condensing excess water from the exhaust. Downstream from the condenser 49 a filter 49a will be provided in order to filter out the hdrocarbons when hydrocarbon analysis is not desired. This filter may be selectively insertable in the stream so that total hydrocarbon and carbon monoxides can be measured on one run and CO on another run with the filter in place. Filtering of lead and particulate matter should also be employed. Flow from the filter 49a leads to the gas flow conduit 11 through a hose or conduit 19. When analyzing the exhausts of certain model automobiles, insufficient oxygen may be present in the exhaust to support the reaction of carbon monoxide in the presence of the catalyst. In such cases, an auxiliary supply of air should be provided. For this purpose, in FIG. 4 a line 50, in which is connected a positive displacement pump 51, adds the necessary excess air. In a typical analysis involving engines in which insufficient air is present in the exhaust, excess air in a ratio of two parts to every part of exhaust gas may be added. As explained above, the gas is thereupon heated by means of the heat transfer medium 30 and a reaction takes place at the thermally responsive detector element 22, the reaction being dependent upon the presence of the component of the gas to be detected, in the illustrative embodiment the component being carbon monoxide. This amount is registered on the meter 34 shown in FIG. 2. An exhaust 20 leads from the analyzer. A flow meter 60 is located in the exhaust line 20. A positive displacement pump 61 provides for control of the flow rate.

The following tables illustrated the analysis obtained for a series of actual test runs on a typical automobile internal combustion engine. The values obtained by the use of the invention appear under the column labelled "Catalytic." For comparison purposes, simultaneous measurements were taken with a non-dispersive infrared analyzer of standard design according to standard methods of operation. Table II gives average values obtained for various modes of engine operation. The values were obtained by area integration of the curve made by chart recorders driven by the catalytic analyzer and a non-dispersive infrared analyzer respectively.

TABLE I.—CYCLE ANALYSIS

| | Percent CO | |
|---|---|---|
| | Non-dispersive infrared | Catalytic |
| Peak values: | | |
| 1 | 0.5 | 0.55 |
| 2 | 0.48 | 0.47 |
| 3 | 2.05 | 2.2 |
| 4 | 0.95 | 0.95 |
| Bag sample | 0.32 | 0.30 |

TABLE II.—AREA INTEGRATION OVER ENTIRE MODE

| | Percent CO | |
|---|---|---|
| Mode | Non-dispersive infrared | Catalytic |
| 0-30 m.p.h. accel | 0.9 | 1.05 |
| 30 cruise | 0.5 | 0.48 |
| 30-0 decel | 0.52 | 0.55 |
| Idle | 0.48 | 0.50 |

It can be seen from the foregoing that the analyses obtained by a catalytic detector instrument made in accordance with the techniques of the invention compares quite favorably with analyses obtained by more costly and complex infrared instruments of the prior art.

Although the invention has been described above as embodied in an instrument uniquely suited for the detection of carbon monoxide and hydrocarbons, it should be understood that its field of use need not be so limited. For example, the invention is well suited for smog analysis or for use in gas chromatography as a chromatographic detector. When so used, the CO, which is separated from the hydrocarbons by conventional techniques using a column, is detected by the analyzing instrument as it elutes from the column. The hydrocarbons are then determined by back flushing the column to remove the hydrocarbons as a group. Inasmuch as Hopcalite has a very high combustion rate for reactive hydrocarbons, this catalyst is ideally suited for use in an instrument intended for chromatography detection.

It can be seen from the foregoing that the invention provides a simple and highly effective means for determination of selected contents of combustion gases. The instrument is capable of operation by relatively unskilled workmen and produces results comparable to those obtained with highly complex and relatively complex instruments now on the market. Among the several advantages of the invention, it should be noted that an important one arises from the use of a block or housing heater for applying heat to the gas stream and the catalytic coated detecting element. The provision of this heater allows for highly accurate control of the temperature at which the reaction takes place. In addition, the arrangement permits the use of smaller bridge currents and voltages, allowing the use of battery or other simplified power supply for the bridge circuit. The measuring circuit is thereby rendered more sensitive inasmuch as variations in the resistance in the detector filament caused by the catalytic reactor will be relatively large in proportion to the overall bridge resistance.

I claim:

1. Apparatus for the analysis of selected oxidizable components in a moisture-containing gaseous mixture comprising a heat conductive housing, a gas flow conduit in said housing for a gas to be analyzed, heater means comprising a heating element in heat exchange relation to the housing thereby effecting conduction heating of the gas flow conduit, a tungsten filament mounted in said conduit, a catalyst coating covering the entire surface of the filament, said coating being a mixture of oxides of copper, cobalt, manganese and silver and a ceramic binder, means controlling said heater element for maintaining the gas in said conduit at a temperature above 212° F., and electrical circuitry connected to said filament and being responsive to changes in filament resistance for indicating the presence of the selected oxidizable components of said gas.

2. Apparatus according to claim 1 wherein said means for controlling said heater maintains the gas in said conduit at a temperature between about 475° F. and 700° F.

3. Apparatus for the analysis of moisture-containing gaseous products of combustion of a fuel/air mixture comprising a housing, a gas flow conduit in said housing for gas to be analyzed, means for introducing air into the flow conduit, a heater for said conduit, a pair of tungsten filaments mounted in said conduit, a first of said filaments being covered with a ceramic coating containing a catalyst which is selectively reactive with carbon monoxide, the catalyst being uniformly distributed in the ceramic coating, and the second of said filaments being covered with a ceramic coating which is chemically inert with respect to the gas components, controllable means for the heater for maintaining a gas temperature in said flow conduit above about 250° F. and circuitry including a measuring device connected to said catalytically coated filament for measuring the percent of carbon monoxide in said gas, said second filament being so connected in said circuit to balance changes in resistance in said first filament not caused by the heat of the carbon monoxide reaction.

4. Apparatus for the analysis of a moisture-containing mixture of gaseous products of combustion comprising a housing, a gas flow conduit in said housing for said mixture of gaseous products to be analyzed, means for introducing air into the flow conduit, a heater for said conduit, a pair of tungsten filaments mounted in said conduit, a first of said filaments being substantially completely encased within a coating comprising a catalyst selectively reactive with respect to an oxidizable gaseous product and a solidified binder in which the catalyst is uniformly dispersed, said binder being formed of material which is substantially stable and inert with respect to the gaseous products at the temperature established by the heating means, and the second of said filaments being substantially completely encased within a coating formed of the same material as the binder used in the coating for the first filament, but in the absence of catalyst, controllable means for the heater for maintaining the gas temperature in said flow conduit above about 250° F., and circuitry including a measuring device connected to said catalytically coated filament for measuring the percent of the selected gaseous product, said second filament being so connected in said circuit to balance changes in resistance in said first filament not caused by the heat of the catalytic oxidation.

5. For use with a combustion type gas analyzer, a thermally responsive electrically resistive element comprising a tungsten filament having a high temperature coefficient of resistance, a pair of electrical leads, each supporting one end of said filament and a ceramic cement coating for said filament, the cement having uniformly dispersed therein a catalyst reactive with a gas to be analyzed, said cement coating being extended over the entire surface area of said filament.

6. An element according to claim 5 wherein said filament is a multi-turned coil and wherein said catalyst containing coating fills the space within said coil.

7. In a gas component combustion type detecting apparatus, a tungsten filament having a high temperature coefficient of resistance, said filament being coated with a ceramic cement having dispersed therein particles of a catalyst comprising a mixture of the oxides of copper, cobalt, manganese and silver.

References Cited

UNITED STATES PATENTS

| | | | |
|---|---|---|---|
| 2,273,981 | 2/1942 | Morgan et al. | 23—232E |
| 2,899,281 | 8/1959 | Olmer | 23—254E |
| 3,460,909 | 8/1969 | Gayle | 23—232CX |

MORRIS O. WOLK, Primary Examiner

R. M. REESE, Assistant Examiner

U.S. Cl. X.R.

23—232E; 73—27; 117—231